(12) United States Patent
Kato

(10) Patent No.: US 10,497,322 B2
(45) Date of Patent: Dec. 3, 2019

(54) DISPLAY DEVICE

(71) Applicant: Japan Display Inc., Tokyo (JP)

(72) Inventor: Hirofumi Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 15 days.

(21) Appl. No.: 15/847,114

(22) Filed: Dec. 19, 2017

(65) Prior Publication Data
US 2018/0211611 A1    Jul. 26, 2018

(30) Foreign Application Priority Data
Jan. 23, 2017    (JP) ................... 2017-009494

(51) Int. Cl.
| | | |
|---|---|---|
| G09G 3/34 | (2006.01) |
| G02F 1/137 | (2006.01) |
| G02F 1/1335 | (2006.01) |
| G02F 1/1368 | (2006.01) |
| G02F 1/1343 | (2006.01) |
| G02F 1/1362 | (2006.01) |

(Continued)

(52) U.S. Cl.
CPC ........... *G09G 3/3413* (2013.01); *G02F 1/137* (2013.01); *G02F 1/1334* (2013.01); *G02F 1/1368* (2013.01); *G02F 1/133621* (2013.01); *G02F 1/134309* (2013.01); *G02F 1/136286* (2013.01); *G09G 3/2092* (2013.01); *G09G 3/342* (2013.01); *G09G 3/3611* (2013.01); *G09G 3/3614* (2013.01); *G09G 3/3648* (2013.01); *G09G 3/3655* (2013.01); *G02F 2001/13347* (2013.01);

(Continued)

(58) Field of Classification Search
CPC ............. G02F 1/1334; G02F 1/133621; G02F 1/134309; G02F 1/136286; G02F 1/1368; G02F 1/137; G02F 2001/13347; G02F 2001/133622; G02F 2201/121; G02F 2201/123; G09G 2300/0478; G09G 2310/08; G09G 2320/062; G09G 2320/064; G09G 2320/0666; G09G 3/2092; G09G 3/3413; G09G 3/342; G09G 3/3611; G09G 3/3614; G09G 3/3648; G09G 3/3655
See application file for complete search history.

(56) References Cited

U.S. PATENT DOCUMENTS

2002/0154256 A1* 10/2002 Gotoh ............... G02F 1/133615
349/65
2005/0232573 A1* 10/2005 Iwauchi ............... G02B 6/0033
385/147

(Continued)

FOREIGN PATENT DOCUMENTS

| JP | 5932135 B2 | 6/2016 |
|---|---|---|
| WO | 2014/017344 A | 1/2014 |
| WO | 2014/136586 A1 | 9/2014 |

*Primary Examiner* — Viet D Pham
(74) *Attorney, Agent, or Firm* — K&L Gates LLP

(57) ABSTRACT

In an embodiment, a display device comprises a display panel, a light source and a controller. The display panel including pixels, a common electrode, pixel electrodes and a liquid crystal layer containing a polymer dispersed liquid crystal. The light source emits light to the display panel. The liquid crystal layer scatters light when scattering voltage is applied between the common electrode and the pixel electrodes, and transmits light when transparent voltage is applied between the common electrode and the pixel electrodes. The controller applies the transparent voltage in a first period, and applies voltage in accordance with image data in a second period.

15 Claims, 15 Drawing Sheets

(51) Int. Cl.
  *G09G 3/36* (2006.01)
  *G02F 1/1334* (2006.01)
  *G09G 3/20* (2006.01)
(52) U.S. Cl.
  CPC ............ *G02F 2001/133622* (2013.01); *G02F 2201/121* (2013.01); *G02F 2201/123* (2013.01); *G09G 2300/0478* (2013.01); *G09G 2310/08* (2013.01); *G09G 2320/062* (2013.01); *G09G 2320/064* (2013.01); *G09G 2320/0666* (2013.01)

(56) References Cited

U.S. PATENT DOCUMENTS

| | | | |
|---|---|---|---|
| 2006/0256069 A1* | 11/2006 | Okazaki | G09G 3/3655 345/102 |
| 2009/0243995 A1* | 10/2009 | Kimura | G09G 3/342 345/102 |
| 2011/0261308 A1* | 10/2011 | Kurokawa | G02F 1/13338 349/138 |
| 2011/0285940 A1* | 11/2011 | Kubota | G02F 1/1334 349/86 |
| 2012/0274624 A1* | 11/2012 | Lee | G09G 3/3648 345/213 |
| 2013/0044280 A1* | 2/2013 | Asaoka | G02F 1/137 349/70 |
| 2014/0253533 A1* | 9/2014 | Miyake | G09G 3/3655 345/212 |
| 2015/0325163 A1 | 11/2015 | Kobayashi | |
| 2016/0062157 A1* | 3/2016 | Kim | G02F 1/13394 349/33 |
| 2016/0109740 A1* | 4/2016 | Lee | G02F 1/13306 345/207 |
| 2016/0154259 A1* | 6/2016 | Kim | G02F 1/137 257/40 |
| 2016/0178979 A1 | 6/2016 | Kita et al. | |

* cited by examiner

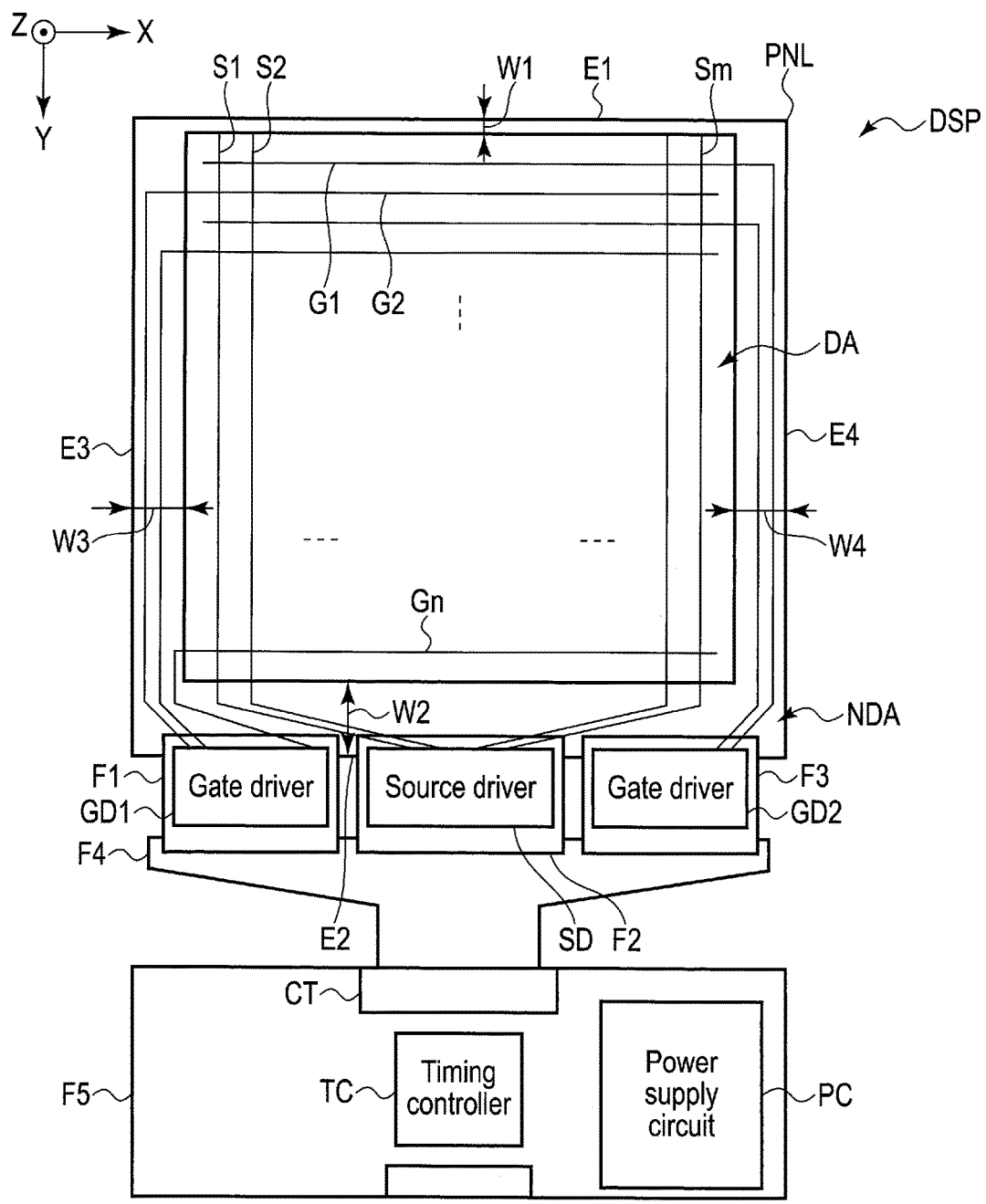
F I G. 1

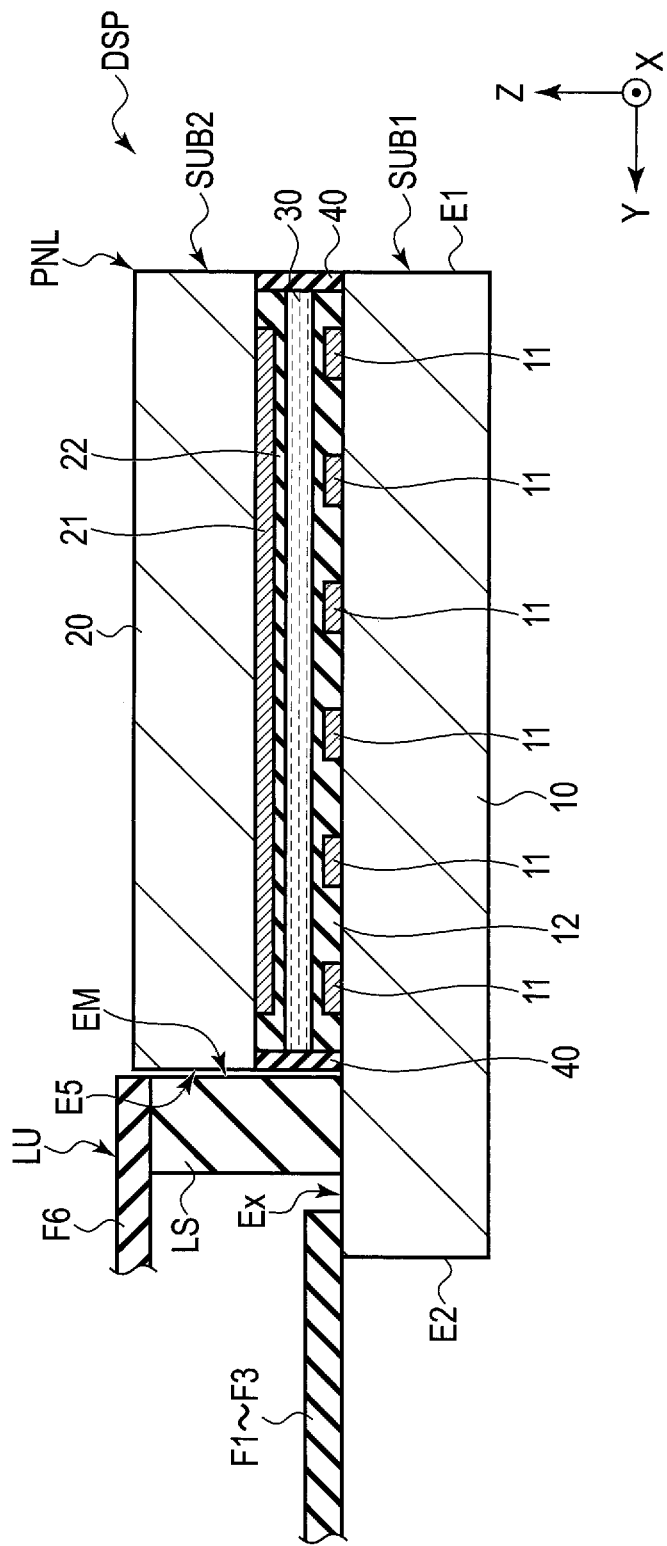
F I G. 2

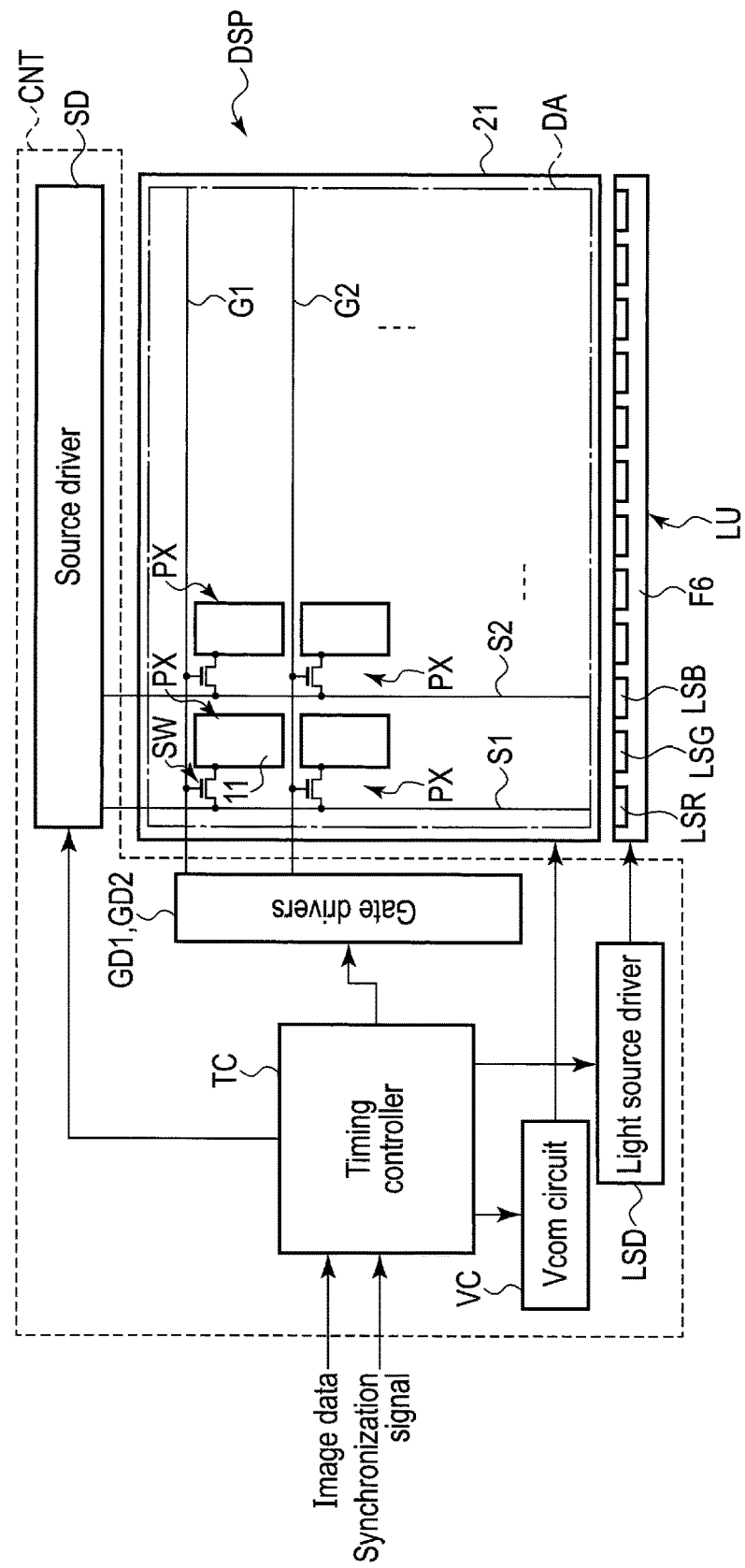
F I G. 3

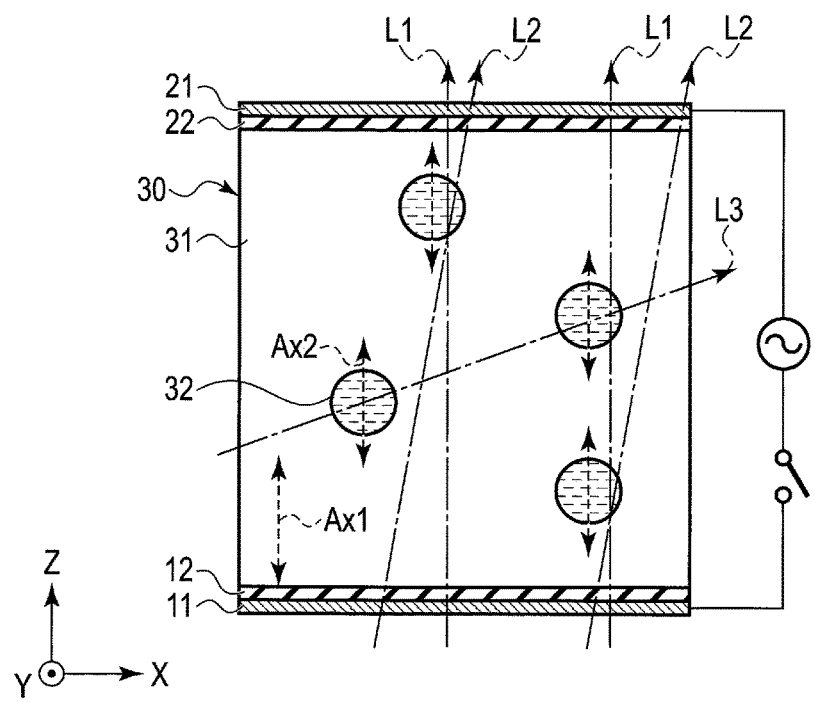
F I G. 4A
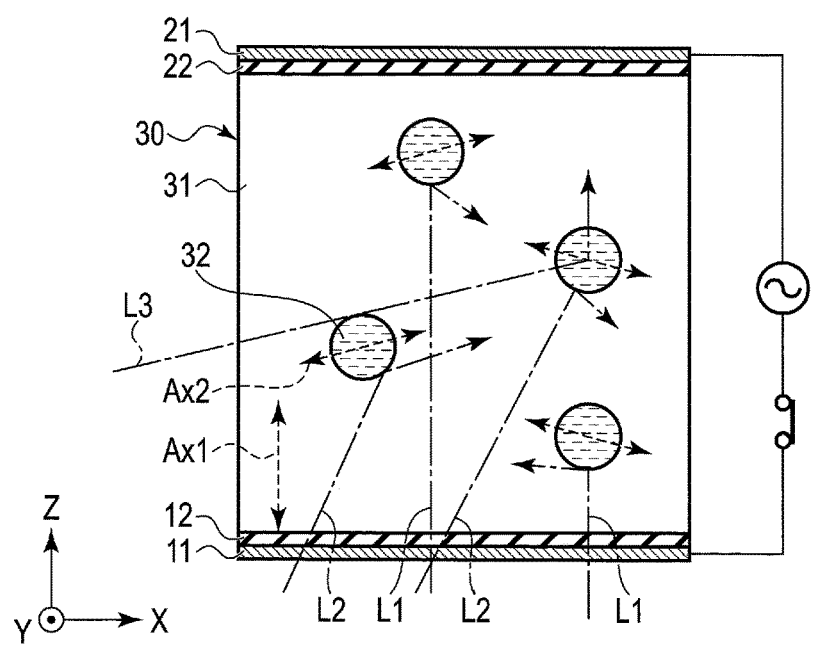
F I G. 4B

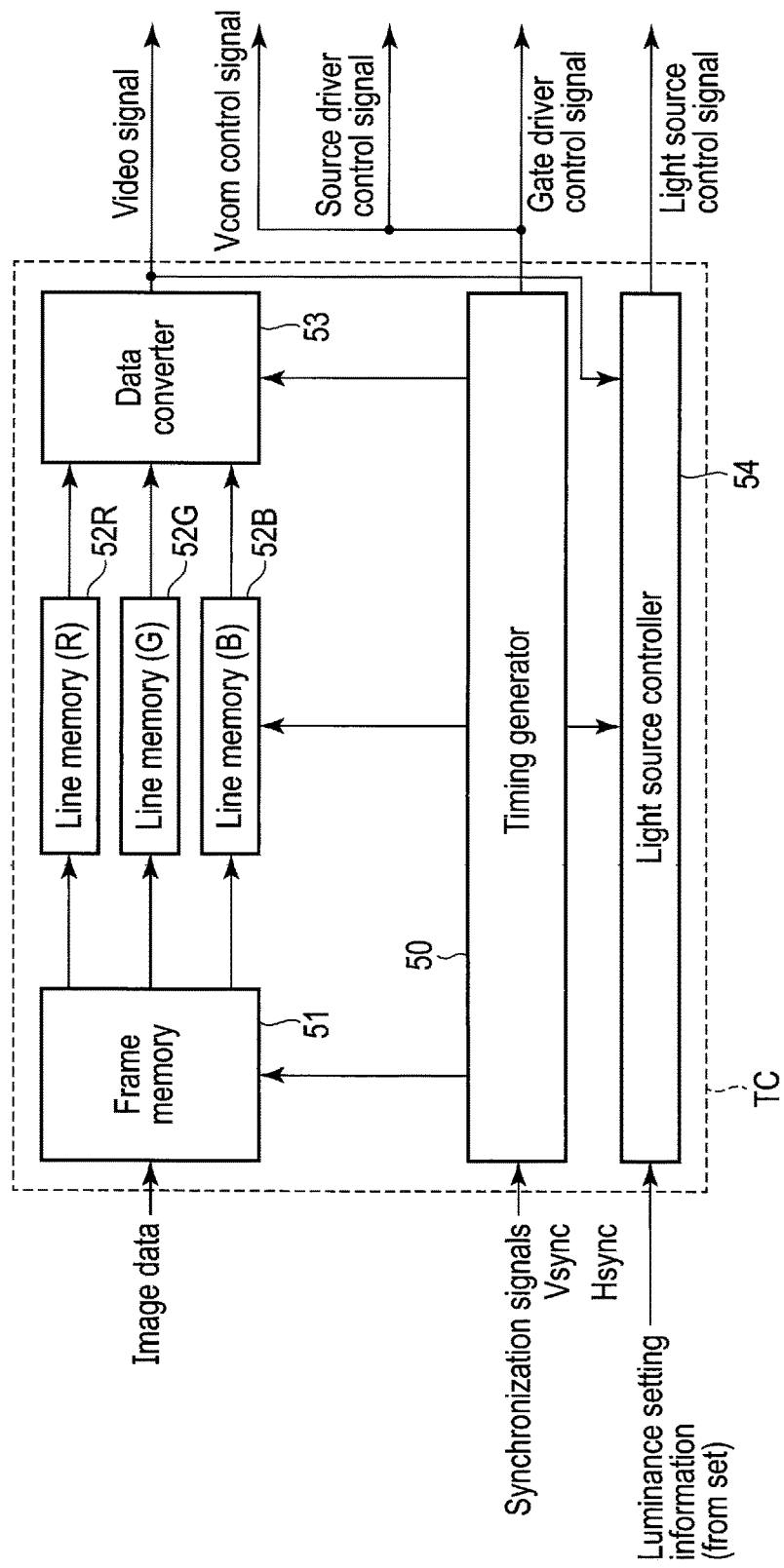
F I G. 11

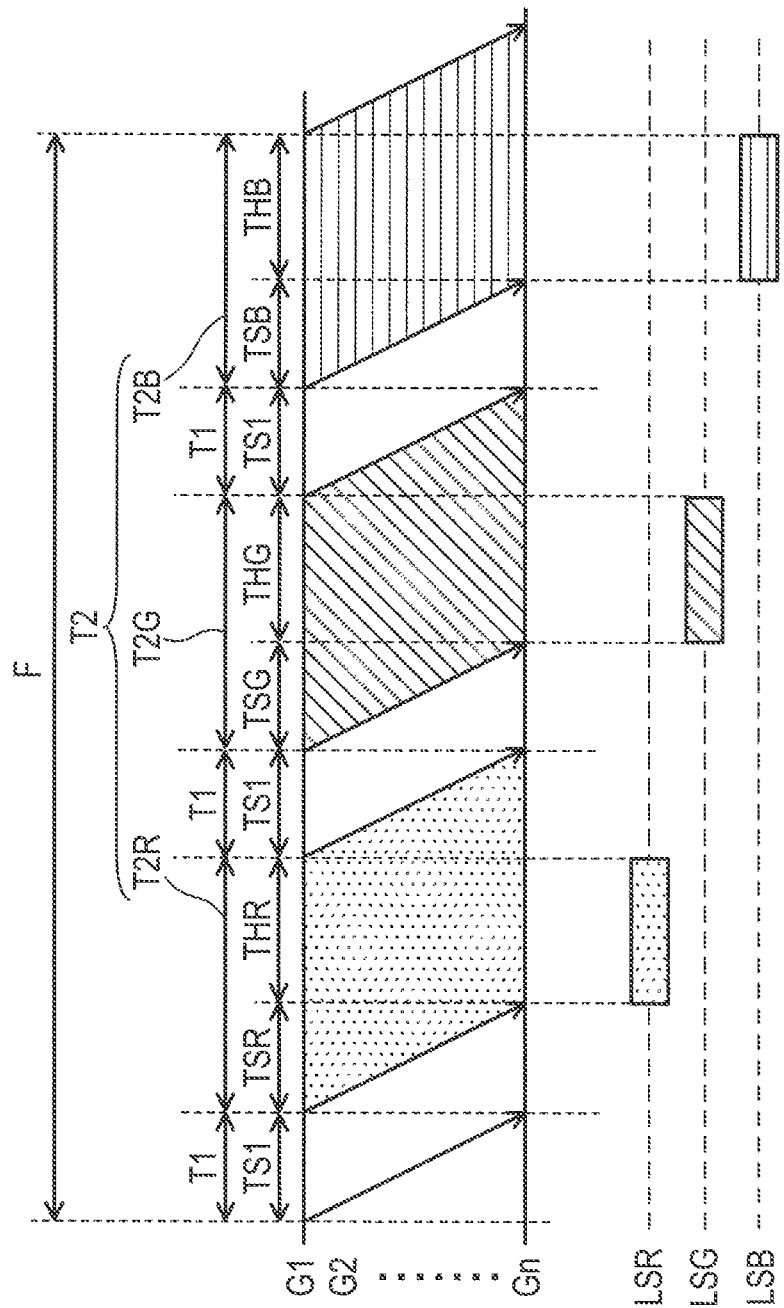
F I G. 13

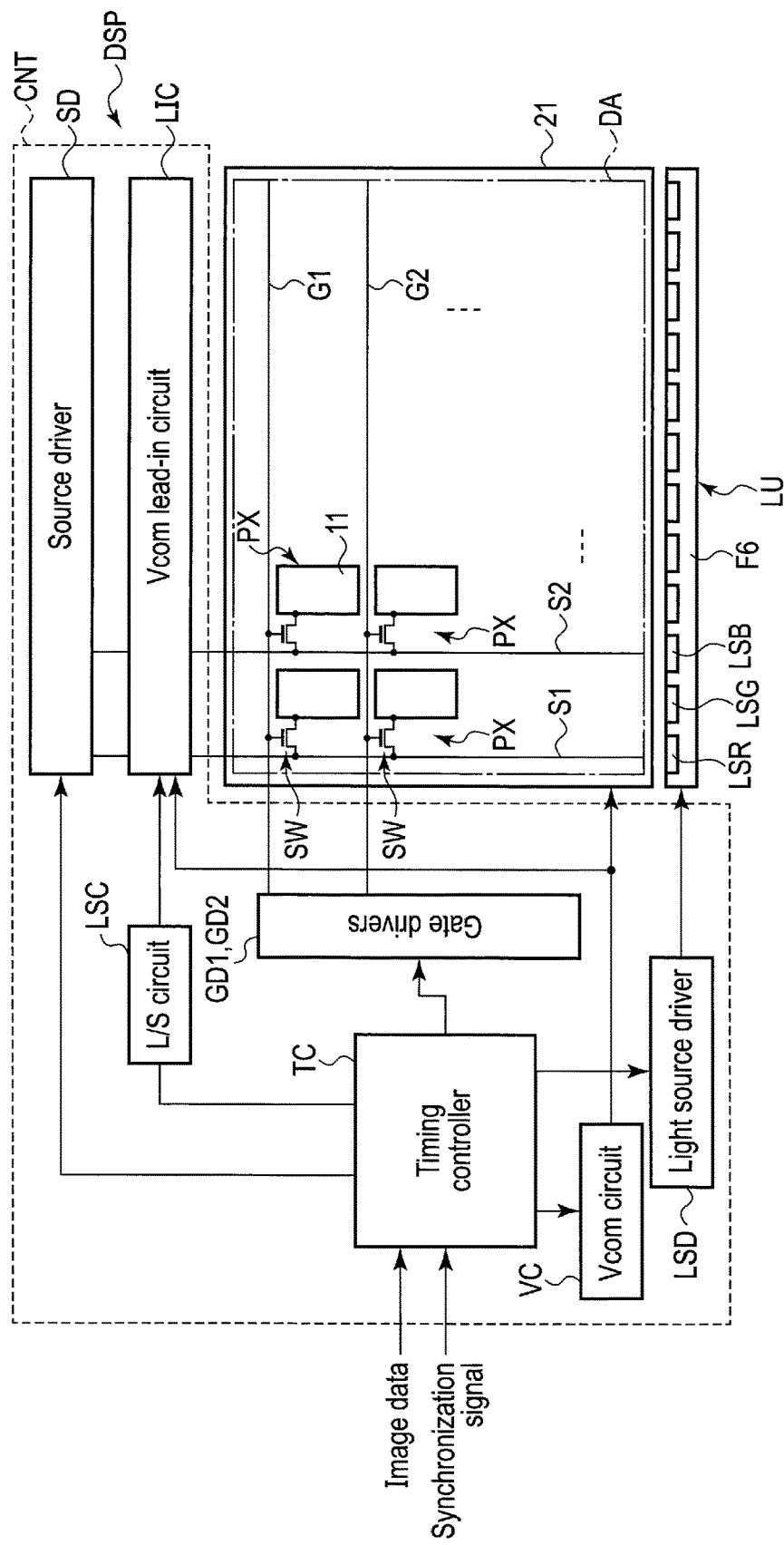
F I G. 15

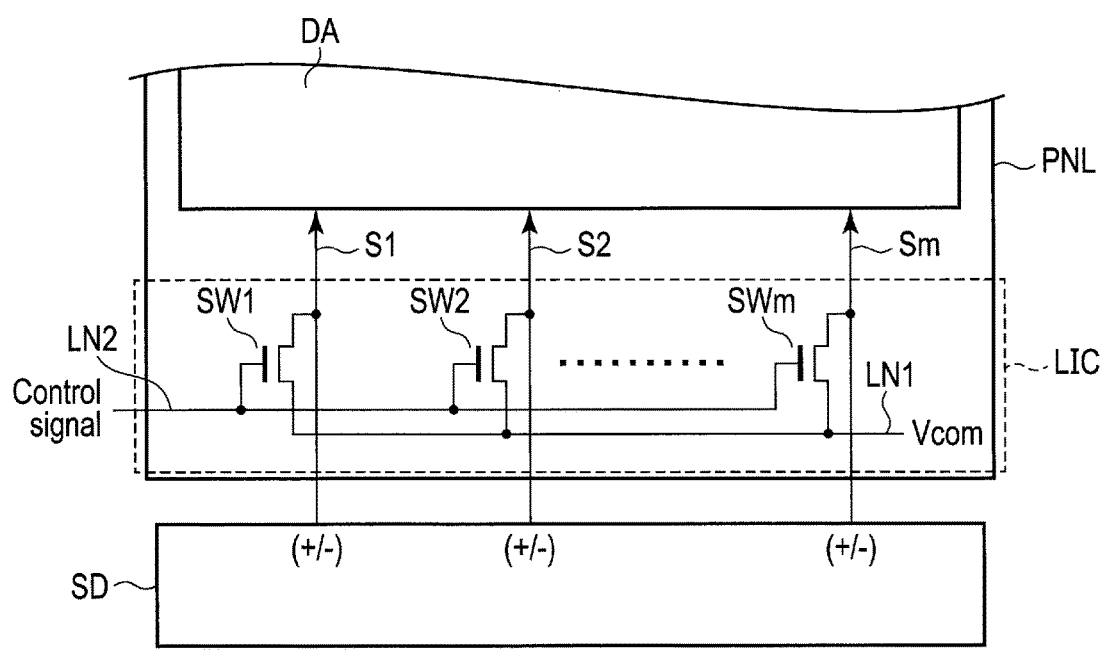
F I G. 16

DISPLAY DEVICE

CROSS-REFERENCE TO RELATED APPLICATIONS

This application is based upon and claims the benefit of priority from Japanese Patent Application No. 2017-009494, filed Jan. 23, 2017, the entire contents of which are incorporated herein by reference.

FIELD

Embodiments described herein relate generally to a display device.

BACKGROUND

In recent years, the following display device has been suggested. The display device includes a polymer dispersed liquid crystal (PDLC) panel capable of switching the state between a diffusing state for diffusing incident light and a transmitting state for transmitting incident light. The display device is capable of displaying an image. The user can view the background through the display device. In the display device, each frame period comprises a plurality of sub-frame periods. The display device realizes multicolor display by displaying an image while the display color is switched for each sub-frame period.

SUMMARY

The present application generally relates to a display device.

In an embodiment, a display device includes a display panel, a light source and a controller. The display panel including pixels, a common electrode, pixel electrodes and a liquid crystal layer containing a polymer dispersed liquid crystal. The light source emits light to the display panel. The liquid crystal layer scatters light when scattering voltage is applied between the common electrode and the pixel electrodes, and transmits light when transparent voltage is applied between the common electrode and the pixel electrodes. The controller applies the transparent voltage in a first period, and applies voltage in accordance with image data in a second period.

BRIEF DESCRIPTION OF THE DRAWINGS

FIG. 1 is a plan view showing a structural example of a display device according to a first embodiment.

FIG. 2 is a cross-sectional view of the display device shown in FIG. 1.

FIG. 3 shows the main structural components of the display device shown in FIG. 1.

FIG. 4A schematically shows a liquid crystal layer in a transparent state.

FIG. 4B schematically shows the liquid crystal layer in a scattering state.

FIG. 11 shows a configuration example of the timing controller shown in FIG. 3.

FIG. 13 is a timing chart showing another example of display operation.

FIG. 15 shows the main structural components of a display device according to a second embodiment.

FIG. 16 shows a structural example of a Vcom lead-in circuit.

DETAILED DESCRIPTION

Figure 5A:
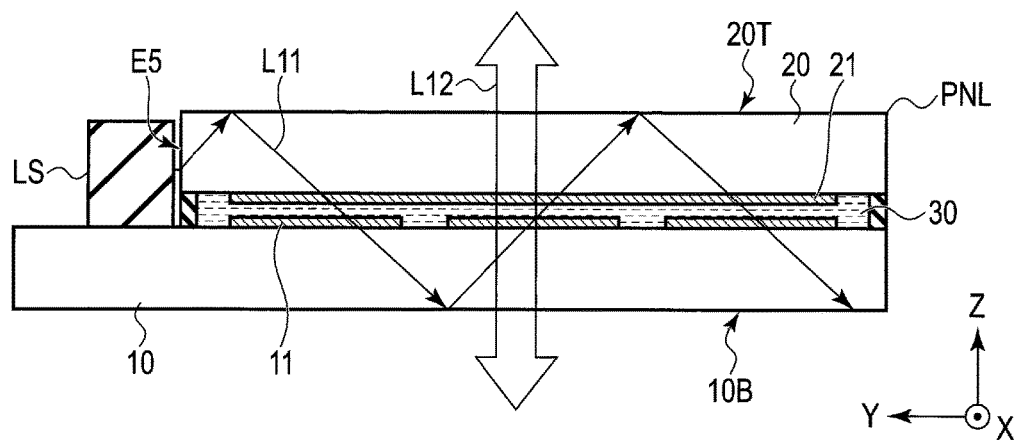
FIG. 5A is a cross-sectional view showing a display panel when the liquid crystal layer is in a transparent state.

In general, according to one embodiment, a display device comprises a display panel, a light source and a controller. The display panel includes a plurality of pixels, a common electrode, a plurality of pixel electrodes provided for the pixels, respectively, and a liquid crystal layer containing a polymer dispersed liquid crystal. The light source emits light to the display panel. The controller controls voltage between the common electrode and the pixel electrodes. The liquid crystal layer scatters light from the light source when scattering voltage is applied between the common electrode and the pixel electrodes, and transmits light from the light source when transparent voltage less than the scattering voltage is applied between the common electrode and the pixel electrodes. The controller applies the transparent voltage between the common electrode and the pixel electrodes in a first period, and applies voltage between the common electrode and the pixel electrodes in accordance with image data in a second period.

This structure allows the provision of a display device capable of improving the visibility of the background and the display quality.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In each embodiment, as an example of a display device, a display device to which a polymer dispersed liquid crystal is applied is explained. The display device of each embodiment may be used for various devices such as a smartphone, a tablet and a mobile phone.

[First Embodiment]

FIG. 1 is a plan view showing a structural example of a display device DSP according to the present embodiment. In FIG. 1, a first direction X intersects a second direction Y. A third direction Z intersects the first direction X and the second direction Y. For example, the first direction X, the second direction Y and the third direction Z are perpendicular to one another. However, they may intersect one another at an angle other than 90 degrees. In this specification, the direction of the arrow indicating the third direction Z is referred to as "upward" (or toward the upper side). The opposite direction of the arrow indicating the third direction Z is referred to as "downward" (or toward the lower side).

The display device DSP comprises a display panel PNL, circuit boards (wiring substrates) F1 to F5, etc. The display panel PNL comprises a display area DA for displaying an image, and a frame-shaped non-display area NDA surrounding the display area DA. The display area DA comprises n scanning lines G (G1 to Gn), m signal lines S (S1 to Sm), etc. Both n and m are positive integers, where n may be equal to m, or n may be different from m. The scanning lines G extend in the first direction X, and are arranged at intervals in the second direction Y. The signal lines S extend in the second direction Y, and are arranged at intervals in the first direction X.

The display panel PNL comprises edge portions E1 and E2 parallel to the first direction X, and edge portions E3 and E4 parallel to the second direction Y. With respect to the width of the non-display area NDA, width W1 between the edge portion E1 and the display area DA in the second direction Y is less than width W2 between the edge portion E2 and the display area DA in the second direction Y. Width W3 between the edge portion E3 and the display area DA in the first direction X is substantially equal to width W4 between the edge portion E4 and the display area DA in the first direction X. Width W3 and width W4 are less than width W2. Width W3 and width W4 may be substantially equal to width W1, or may be different from width W1.

The circuit boards F1 to F3 are arranged in this order in the first direction X. The circuit board F1 comprises a gate driver GD1. The circuit board F2 comprises a source driver SD. The circuit board F3 comprises a gate driver GD2. The circuit boards F1 to F3 are connected to the display panel PNL and the circuit board F4. The circuit board F5 comprises a timing controller TC, a power supply circuit PC, etc. The circuit board F4 is connected to a connector CT provided in the circuit board F5. The circuit boards F1 to F3 may be replaced by a single circuit board. The circuit boards F1 to F4 may be replaced by a single circuit board.

In the example shown in FIG. 1, the odd-numbered scanning lines from the edge portion E1 side are electrically connected to the gate driver GD2, and the even-numbered scanning lines are electrically connected to the gate driver GD1. However, the connection relationships of the gate drivers GD1 and GD2 and the scanning lines are not limited to the example shown in FIG. 1.

FIG. 2 is a cross-sectional view of the display device DSP shown in FIG. 1. Here, this specification merely explains the main part of a section of the display device DSP in the Y-Z plane defined by the second direction Y and the third direction Z.

The display panel PNL comprises a first substrate SUB1, a second substrate SUB2, a liquid crystal layer 30, etc. The first substrate SUB1 comprises a transparent substrate 10, pixel electrodes 11, an alignment film 12, etc. The second substrate SUB2 comprises a transparent substrate 20, a common electrode 21, an alignment film 22, etc. The pixel electrodes 11 and the common electrode 21 are formed of a transparent conductive material such as indium tin oxide (ITO) or indium zinc oxide (IZO). The liquid crystal layer 30 contains a polymer dispersed liquid crystal, and is located between the alignment films 12 and 22. The first substrate SUB1 is attached to the second substrate SUB2 with a sealant 40. The first substrate SUB1 comprises an extension portion EX extending in the second direction Y in comparison with an edge portion E5 of the transparent substrate 20. The circuit boards F1 to F3 are connected to the extension portion EX of the first substrate SUB1.

A light source unit LU comprises a light-emitting element LS, a circuit board F6, etc. The light-emitting element LS is connected to the circuit board F6, and is located on the extension portion EX. The light-emitting element LS comprises a light-emitting portion EM facing the edge portion E5. As described later, the illumination light emitted from the light-emitting portion EM enters the display panel PNL through the edge portion E5, and is propagated through the display panel PNL.

FIG. 3 shows the main structural components of the display device DSP shown in FIG. 1. The display device DSP comprises a controller CNT. The controller CNT is indicated by a dashed line in FIG. 3. The controller CNT includes the timing controller TC, the gate drivers GD1 and GD2, the source driver SD, a Vcom circuit VC, a light source driver LSD, etc.

The timing controller TC generates various signals based on the image data and synchronization signals input from outside. For example, the timing controller TC outputs a video signal generated by a predetermined signal process to the source driver SD based on image data. The timing controller TC outputs a control signal generated based on a synchronization signal to the gate drivers GD1 and GD2, the source driver SD, the Vcom circuit VC and the light source driver LSD. The detail of the timing controller TC is explained later.

The display area DA indicated by the alternate long and short dash line in FIG. 3 comprises a plurality of pixels PX. Each pixel PX comprises a switching element SW and a pixel electrode 11. Each switching element SW is electrically connected to a corresponding scanning line G and a corresponding signal line S. Each pixel electrode 11 is connected to a corresponding signal line S via a corresponding switching element SW. The common electrode 21 faces a plurality of pixel electrodes 11. A scanning signal is supplied to each scanning line G from the gate driver GD1 or GD2. A video signal is supplied to each signal line S from the source driver SD. Common voltage is applied to the common electrode 21 from the Vcom circuit VC. When a switching element SW is in a conduction state based on the scanning signal supplied to the scanning line G, the video signal supplied to the signal line S is supplied to the pixel electrode 11 connected to the switching element SW. In the following explanation, the generation of a potential difference between a pixel electrode 11 and the common electrode 21 by supplying a video signal to the pixel electrode 11 may be described as to write a video signal (or to apply voltage) to the pixel PX comprising the pixel electrode 11.

In the example of FIG. 3, the common electrode 21 is located over the entire display area DA. However, a plurality of common electrodes 21 each based on at least one pixel PX may be arranged in the display area DA. The common electrodes 21 may be connected to a common line such that common voltage is applied to the common electrodes 21 from the Vcom circuit VC via the common line.

The light source unit LU comprises, as light-emitting elements LS, a light-emitting element LSR which emits red light, a light-emitting element LSG which emits green light and a light-emitting element LSB which emits blue light. The light source driver LSD controls the lighting period of the light-emitting elements LSR, LSG and LSB in accordance with the luminance setting information from outside, the video signal output from a data converter 53 as described later and a control signal from the timing controller TC described later. As explained in detail later, in a drive scheme in which each frame period comprises a plurality of sub-frame (field) periods, at least one of the three light-emitting elements LSR, LSG and LSB lights up in each sub-frame, and the color of the illumination light is switched based on each sub-frame.

Now, this specification explains a structural example of the display device comprising the liquid crystal layer 30 which is a polymer dispersed liquid crystal layer.

FIG. 4A schematically shows the liquid crystal layer 30 in a transparent state. The liquid crystal layer 30 contains a liquid crystal polymer 31 and liquid crystal molecules 32. The liquid crystal polymer 31 is obtained when, for example, liquid crystal monomers are polymerized in a state where the liquid crystal monomers are aligned in a predetermined direction by the alignment restriction force of the alignment films 12 and 22. The liquid crystal molecules 32 are dispersed in liquid crystal monomers. When the liquid crystal monomers are polymerized, the liquid crystal molecules 32 are aligned in a predetermined direction based on the alignment direction of the liquid crystal monomers. The alignment films 12 and 22 may be horizontal alignment films for aligning the liquid crystal monomers and the liquid crystal molecules 32 along the X-Y plane defined by the first direction X and the second direction Y, or may be vertical alignment films for aligning the liquid crystal monomers and the liquid crystal molecules 32 in the third direction Z.

The liquid crystal molecules 32 may be positive liquid crystal molecules having positive dielectric anisotropy, or may be negative liquid crystal molecules having negative dielectric anisotropy. The liquid crystal polymer 31 and the liquid crystal molecules 32 have the same optical anisotropy. Alternatively, the liquid crystal polymer 31 and the liquid crystal molecules 32 have substantially the same refractive anisotropy. Thus, the liquid crystal polymer 31 and the liquid crystal molecules 32 have substantially the same ordinary index and substantially the same extraordinary index. It should be noted that the ordinary index or extraordinary index of the liquid crystal polymer 31 may not be completely the same as that of the liquid crystal molecules 32. A difference made by a manufacturing error, etc., is allowed. The response property for an electric field differs between the liquid crystal polymer 31 and the liquid crystal molecules 32. The response property of the liquid crystal polymer 31 for an electric field is lower than the response property of the liquid crystal molecules 32 for an electric field.

The example shown in FIG. 4A is equivalent to, for example, a state in which voltage is not applied to the liquid crystal layer 30 (a state in which the potential difference between the pixel electrode 11 and the common electrode 21 is zero), or a state in which the transparent voltage described later is applied to the liquid crystal layer 30.

As shown in FIG. 4A, optical axis Ax1 of the liquid crystal polymer 31 is parallel to optical axis Ax2 of each liquid crystal molecule 32. In the example shown in FIG. 4A, both optical axis Ax1 and optical axis Ax2 are parallel to the third direction Z. Here, each optical axis is equivalent to a line parallel to the direction of travel of a light beam in which the refractive index takes a single value regardless of the direction of polarization.

As described above, the liquid crystal polymer 31 and the liquid crystal molecules 32 have substantially the same refractive anisotropy. Further, optical axis Ax1 is parallel to optical axis Ax2. Thus, in all directions including the first direction X, the second direction Y and the third direction Z, there is little difference in the refractive index between the liquid crystal polymer 31 and the liquid crystal molecules 32. Thus, light L1 entering the liquid crystal layer 30 in the third direction Z passes through the liquid crystal layer 30 with little scattering. Similarly, both light L2 and light L3 entering the liquid crystal layer 30 in a direction inclined with respect to the third direction Z are scattered very little in the liquid crystal layer 30. In this way, a high transparency can be obtained. The state shown in FIG. 4A is called a transparent state.

FIG. 4B schematically shows the liquid crystal layer 30 in a scattering state. As described above, the response property of the liquid crystal polymer 31 for an electric field is lower than the response property of the liquid crystal molecules 32 for an electric field. Thus, in a state where voltage (the scattering voltage described later) higher than the transparent voltage described above is applied to the liquid crystal layer 30, the alignment direction of the liquid crystal polymer 31 hardly changes. However, the alignment direction of the liquid crystal molecules 32 is changed based on the electric field. As shown in FIG. 4B, optical axis Ax1 is substantially parallel to the third direction Z. However, optical axis Ax2 is inclined with respect to the third direction Z. Thus, optical axis Ax1 intersects optical axis Ax2. In all directions including the first direction X, the second direction Y and the third direction Z, the refractive index differs largely between the liquid crystal polymer 31 and the liquid crystal molecules 32. In this way, light L1 to light L3 entering the liquid crystal layer 30 are scattered in the liquid crystal layer 30. The state shown in FIG. 4B is called a scattering state.

FIG. 5A is a cross-sectional view showing the display panel PNL when the liquid crystal layer 30 is in a transparent state. Illumination light L11 emitted from the light-emitting element LS enters the display panel PNL through the edge portion E5, and is propagated through the transparent substrate 20, the liquid crystal layer 30, the transparent substrate 10, etc. When the liquid crystal layer 30 is in a transparent state, illumination light L11 is hardly scattered in the liquid crystal layer 30. Thus, illumination light L11 hardly leaks out of a lower surface 10B of the transparent substrate 10 and an upper surface 20T of the transparent substrate 20.

External light L12 entering the display panel PNL passes through the liquid crystal layer 30 with little scattering. The external light entering the display panel PNL through the lower surface 10B is emitted from the upper surface 20T. The external light entering the display panel PNL through the upper surface 20T is emitted from the lower surface 10B. Thus, when the display panel PNL is observed from the upper surface 20T side, the background on the lower surface 10B side can be viewed through the display panel PNL. Similarly, when the display panel PNL is observed from the lower surface 10B side, the background on the upper surface 20T side can be viewed through the display panel PNL.

Figure 5B:
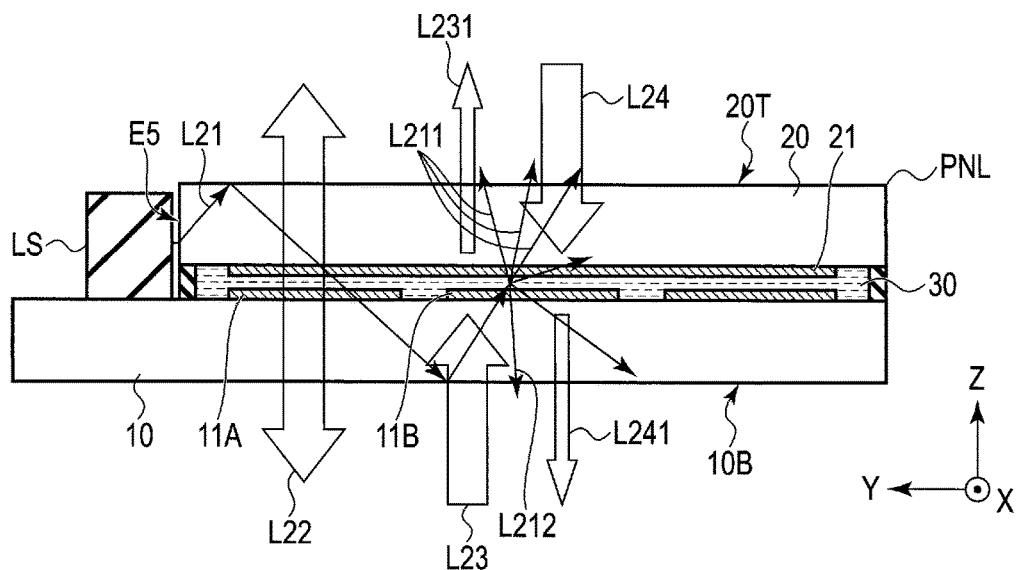
FIG. 5B is a cross-sectional view showing the display panel when the liquid crystal layer is in a scattering state.

FIG. 5B is a cross-sectional view showing the display panel when the liquid crystal layer 30 is in a scattering state. Illumination light L21 emitted from the light-emitting element LS enters the display panel PNL through the edge portion E5, and is propagated through the transparent substrate 20, the liquid crystal layer 30, the transparent substrate 10, etc. In the example shown in FIG. 5B, as the liquid crystal layer 30 between a pixel electrode 11A and the common electrode 21 is in a transparent state, illumination light L21 is hardly scattered in the liquid crystal layer 30. As the liquid crystal layer 30 between a pixel electrode 11B and the common electrode 21 is in a scattering state, illumination light L21 is scattered at the position overlapping the pixel electrode 11B in the liquid crystal layer 30. Of illumination light L21, partial scattered light L211 is emitted from the upper surface 20T, and partial scattered light L212 is emitted from the lower surface 10B.

At the position overlapping the pixel electrode 11A, external light L22 entering the display panel PNL passes through the liquid crystal layer 30 with little scattering in a manner similar to external light L12 shown in FIG. 5A. At the position overlapping the pixel electrode 11B, external light L23 entering the display panel PNL through the lower surface 10B is partially scattered in the liquid crystal layer 30. As a result, partial light L231 is emitted from the upper surface 20T. External light L24 entering the display panel PNL through the upper surface 20T is partially scattered in the liquid crystal layer 30. As a result, partial light L241 is emitted from the lower surface 10B.

Thus, when the display panel PNL is observed from the upper surface 20T side, the color of illumination light L21 can be viewed at the position overlapping the pixel electrode 11B. Since partial external light L231 passes through the display panel PNL, the background on the lower surface 10B side can be also viewed through the display panel PNL. Similarly, when the display panel PNL is observed from the lower surface 10B side, the color of illumination light L21 can be viewed at the position overlapping the pixel electrode 11B. Since partial external light L241 passes through the display panel PNL, the background on the upper surface 20T side can be also viewed through the display panel PNL. At the position overlapping the pixel electrode 11A, the liquid crystal layer 30 is in a transparent state. Thus, the color of illumination light L21 is hardly viewed. The background can be viewed through the display panel PNL.

Figure 6:
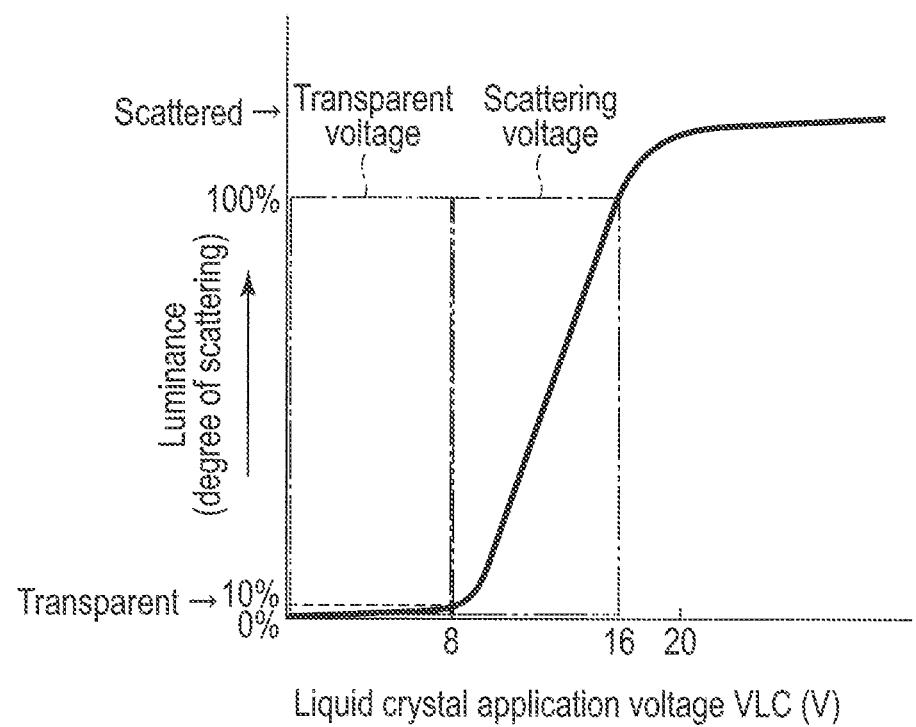
FIG. 6 is a graph showing the scattering property of the liquid crystal layer.

FIG. 6 is a graph showing the scattering property of the liquid crystal layer 30, and shows the relationship between voltage VLC applied to the liquid crystal layer 30 and the luminance. Here, as shown in, for example, FIG. 5B, the luminance is equivalent to the luminance of scattered light L211 obtained when illumination light L21 emitted from the light-emitting element LS is scattered in the liquid crystal layer 30. In another respect, the luminance indicates the degree of scattering of the liquid crystal layer 30.

While voltage VLC is increased from 0 V, the luminance steeply rises in an area where voltage VLC exceeds approximately 8 V. When voltage VLC reaches approximately 20 V, the luminance is saturated. When voltage VLC is between 0 V and 8 V, the luminance is slightly increased. In the present embodiment, the voltage in the range surrounded by the alternate long and two short dashes line, in other words, the range between 8 V and 16 V, is used for the gradation reproduction of each pixel (for example, 256 levels). Hereinafter, the voltage of 8 V<VLC≤16 V is referred to as scattering voltage. In the present embodiment, the voltage in the range surrounded by the alternate long and short dash line, in other words, the voltage of 0 V≤VLC≤8 V, is referred to as transparent voltage. The lower and upper limits of scattering voltage and the lower and upper limits of transparent voltage is not limited to this example. They may be arbitrarily determined based on the scattering property of the liquid crystal layer 30.

For example, it is assumed that the luminance is 100% when scattering voltage is 16 V as the upper limit. In this case, the range of transparent voltage may be defined as the range of voltage VLC in which the luminance is less than 10%. Alternatively, transparent voltage may be defined as voltage VLC less than or equal to voltage (8 V in the example of FIG. 6) corresponding to the minimum gradation.

Figure 7A:
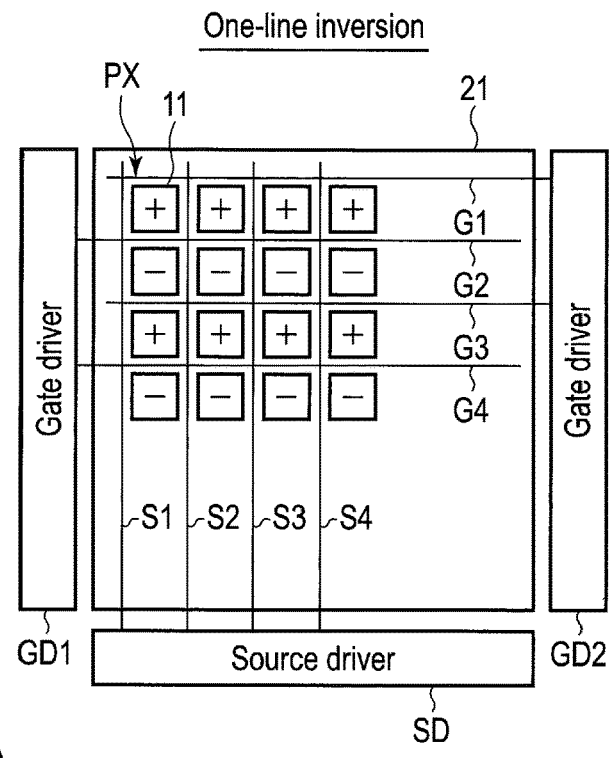
FIG. 7A shows the outline of a one-line inversion drive scheme.
Figure 7B:
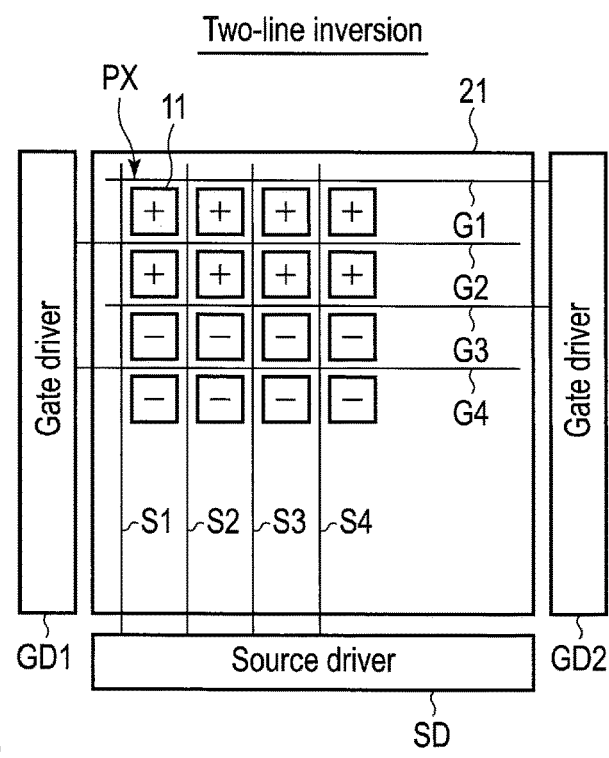
FIG. 7B shows the outline of a two-line inversion drive scheme.
Figure 7C:
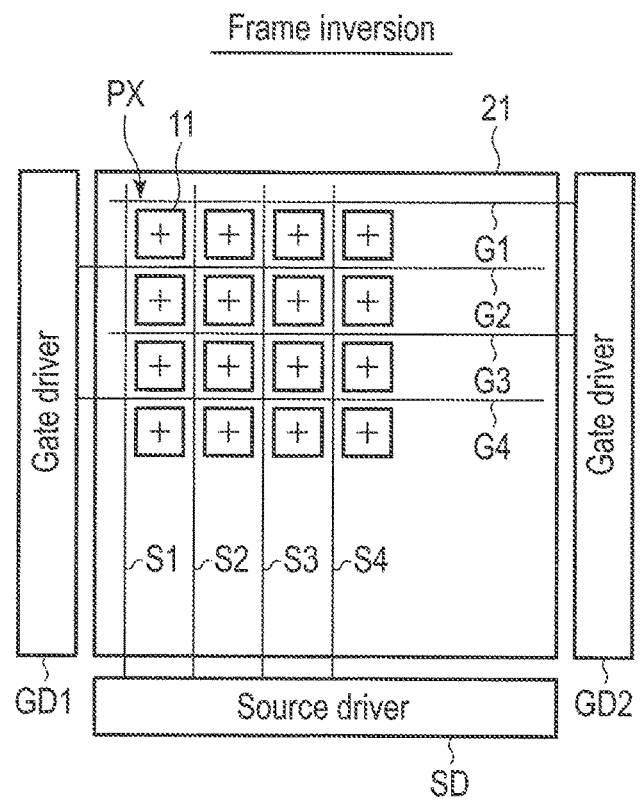
FIG. 7C shows the outline of a frame-inversion drive scheme.

Polarity inversion for inverting the polarity of the voltage applied to the liquid crystal layer 30 may be applied to the display device DSP. FIG. 7A, FIG. 7B and FIG. 7C show the outline of polarity inversion. FIG. 7A shows a one-line-inversion drive scheme for inverting the voltage applied to the liquid crystal layer 30 (in other words, the voltage written to the pixels PX) between positive polarity (+) and negative polarity (−) for the group of pixels PX connected to each scanning line G (in other words, for each line). In this drive method, for example, the polarity of the common voltage applied to the common electrode 21 and the polarity of the video signal supplied from the source driver SD to the signal lines S (in other words, the polarity of signal line voltage) are inverted for each horizontal period in which the gate drivers GD1 and GD2 supply a scanning signal to the scanning lines G. In the same horizontal period, the polarity of common voltage is, for example, opposite to that of a video signal.

FIG. 7B shows a two-line-inversion drive scheme for inverting the voltage applied to the liquid crystal layer 30 between positive polarity (+) and negative polarity (−) for every two consecutive lines. The present embodiment is not limited to the examples of FIG. 7A and FIG. 7B. The polarity may be inverted for every three or more lines.

FIG. 7C shows a frame-inversion drive scheme for inverting the voltage applied to the liquid crystal layer 30 between positive polarity (+) and negative polarity (−) for each frame period in which an image is displayed based on image data. In this drive method, for example, the polarity of common voltage and the polarity of a video signal are inverted for each frame period. In the same frame period, the polarity of common voltage is, for example, opposite to that of a video signal.

Figure 8:
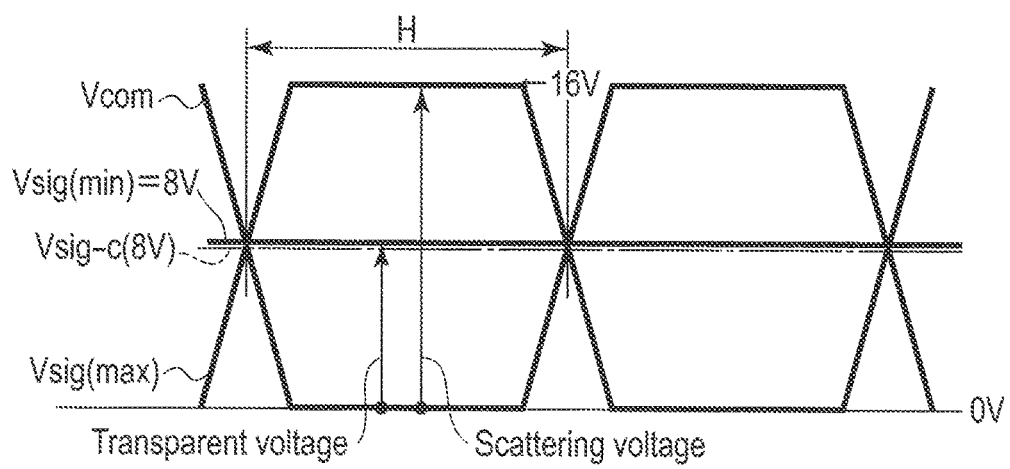
FIG. 8 shows an example of common voltage and signal line voltage in display scanning.

FIG. 8 shows an example of common voltage Vcom applied to the common electrode 21 and signal line voltage Vsig applied to the signal lines S (or the pixel electrodes 11) in display scanning to which the one-line-inversion drive scheme shown in FIG. 7A is applied. With respect to signal line voltage Vsig, FIG. 8 shows a pattern corresponding to the maximum value (max) of gradation and a pattern corresponding to the minimum value (min) of gradation. In the example of FIG. 8, the polarity of common voltage Vcom and the polarity of signal line voltage Vsig (see the pattern of the maximum value) are inverted for each horizontal period H based on reference voltage Vsig-c as the center. The voltage higher than reference voltage Vsig-c is positive. The voltage less than reference voltage Vsig-c is negative. Reference voltage Vsig-c is, for example, 8 V. In each of common voltage Vcom and signal line voltage Vsig, the lower limit is 0 V, and the upper limit is 16 V.

In a period in which common voltage Vcom is negative, signal line voltage Vsig is voltage based on the gradation indicated by image data in the range greater than or equal to 8 V and less than or equal to 16 V. In a period in which common voltage Vcom is positive, signal line voltage Vsig is voltage based on the gradation indicated by image data in the range greater than or equal to 0 V and less than or equal to 8 V. In either case, voltage greater than or equal to 8 V and less than or equal to 16 V is applied between the common electrode 21 and the pixel electrodes 11.

A polarity inversion signal is input to the source driver SD. For example, when a polarity inversion signal is high (H), the source driver SD simultaneously applies positive signal line voltage Vsig to the signal lines S1 to Sm. When a polarity inversion signal is low (L), the source driver SD simultaneously applies negative signal line voltage Vsig to the signal lines S1 to Sm. Thus, the source driver SD can simultaneously apply only positive signal line voltage Vsig (for example, Vsig-c to 16 V) or negative signal line voltage Vsig (for example, 0 V to Vsig-c) to the signal lines S1 to Sm. In this way, the polarity of common voltage Vcom is set so as to be opposite to the polarity of signal line voltage Vsig.

However, when a source driver SD with a high withstand voltage is used, common voltage Vcom may be fixed to, for example, 0 V. For example, when the withstand voltage of the source driver SD is 32 V, and further when a polarity inversion signal is high (H), the source driver SD may apply 0 to 16 V of signal line voltage Vsig. When the withstand voltage of the source driver SD is 32 V, and further when a polarity inversion signal is low (L), the source driver SD may apply 0 to −16 V of signal line voltage Vsig.

As shown in FIG. 6, even when voltage VLC applied to the liquid crystal layer 30 is 8 V, the degree of scattering of the liquid crystal layer 30 is approximately 0% to 10%. Even when signal line voltage Vsig is the minimum value of gradation, the external light entering the display panel PNL is slightly scattered. Thus, the visibility of the background of the display panel PNL may be decreased.

In the present embodiment, the visibility of the background of the display panel PNL can be improved by incorporating transparent scanning in which the voltage between the pixel electrodes 11 and the common electrode 21 is less than, for example, the lower limit of gradation (in other words, the scanning in a first period T1 as described later) into the sequence of image display.

Figure 9:
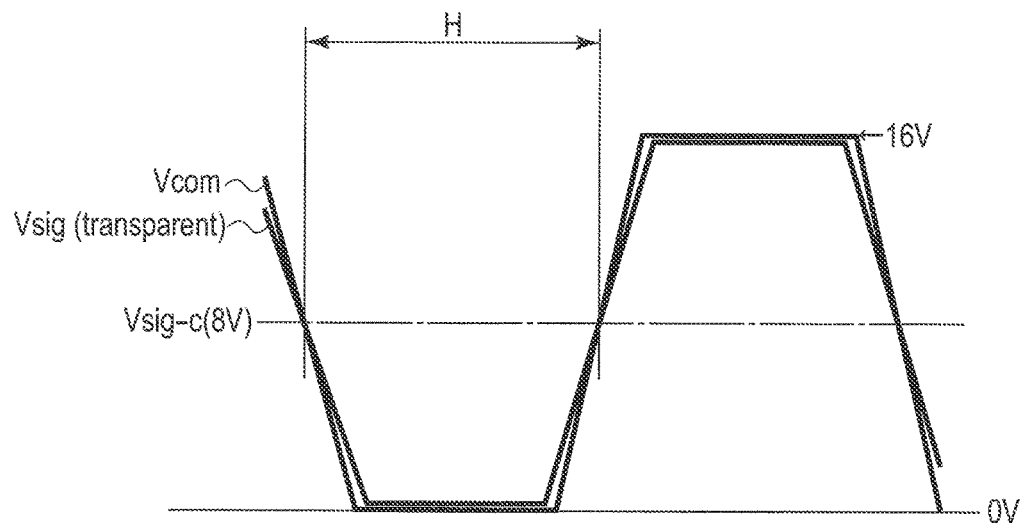
FIG. 9 shows an example of common voltage and signal line voltage in transparent scanning.

FIG. 9 shows an example of common voltage Vcom and signal line voltage Vsig in transparent scanning. In a manner similar to that of the example of FIG. 8, the polarity of common voltage Vcom is inverted for each horizontal period H. In transparent scanning, the polarity of signal line voltage Vsig is the same as the polarity of common voltage Vcom. In this way, the potential difference between signal line voltage Vsig and common voltage Vcom is less than 8 V, thereby increasing the transparency of the liquid crystal layer 30. In the example of FIG. 9, signal line voltage Vsig coincides with common voltage Vcom in each horizontal period H. In FIG. 9, signal line voltage Vsig and common voltage Vcom are shown such that they are slightly different from each other for the sake of convenience.

With regard to signal line voltage Vsig in transparent scanning, the voltage applied to the liquid crystal layer 30 should be less than the lower limit (for example, 8 V) of gradation. Thus, signal line voltage Vsig may not completely match common voltage Vcom. Signal line voltage Vsig in transparent scanning can be determined in the range of 0 V≤Vsig<8 V when common voltage Vcom is negative. Signal line voltage Vsig in transparent scanning can be determined in the range of 8 V<Vsig≤16 V when common voltage Vcom is positive.

Figure 10:
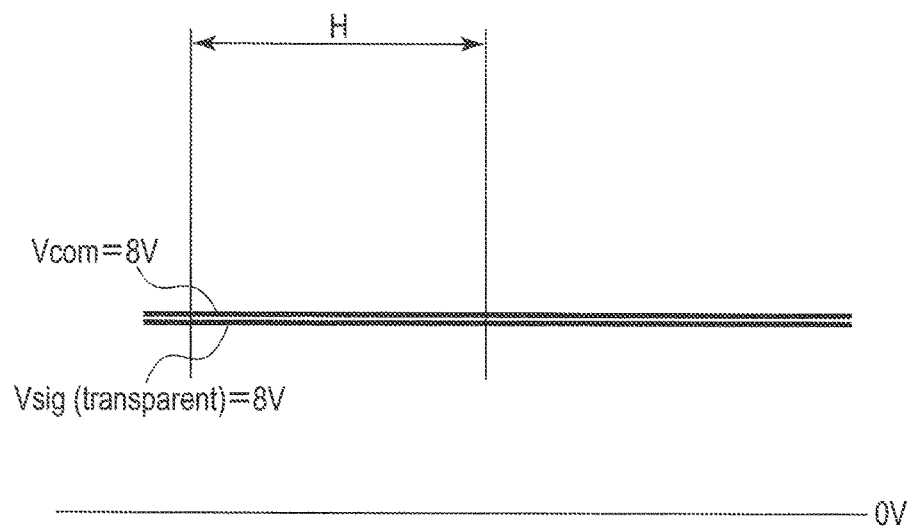
FIG. 10 shows another example of common voltage and signal line voltage in transparent scanning.

FIG. 10 shows another example of common voltage Vcom and signal line voltage Vsig in transparent scanning. In the example of FIG. 10, in transparent scanning, the polarity inversion of common voltage Vcom and signal line voltage Vsig is stopped. Further, common voltage Vcom coincides with signal line voltage Vsig at 8 V (that is, the above reference voltage Vsig-c). Common voltage Vcom may match signal line voltage Vsig at voltage other than reference voltage Vsig-c. Common voltage Vcom may be different from signal line voltage Vsig in, for example, a range in which the potential difference between them is greater than 0 V and less than 8 V.

In the above description, transparent scanning is explained with the example of a one-line-inversion drive scheme. However, the same transparent scanning can be applied to two-line and more-line-inversion drive schemes and a frame-inversion drive scheme.

Now, this specification explains a control example of the display device DSP into which transparent scanning is incorporated, referring to FIG. 11 to FIG. 14. Here, a drive system in which each frame period comprises a plurality of sub-frame (field) periods is applied to the display device DSP. This drive system is called, for example, a field sequential system. In each sub-frame period, a red, green or blue image is displayed. The images of the respective colors displayed by time division are viewed by the user as an image of multicolor display.

FIG. 11 shows a configuration example of the timing controller TC shown in FIG. 3. The timing controller TC comprises a timing generator 50, a frame memory 51, line memories 52R, 52G and 52B, a data converter 53, a light source controller 54, etc.

The frame memory 51 stores image data for one frame input from outside. The line memories 52R, 52G and 52B store red, green and blue sub-frame data, respectively. The sub-frame data indicates the red, green or blue image (for example, the gradation value of each pixel) to be displayed in the pixels PX by time division. The sub-frame data of each color stored in the line memories 52R, 52G and 52B corresponds to the frame which is one frame before the image data stored in the frame memory 51. The data converter 53 generates a video signal by applying various data conversion processes such as gamma correction to the sub-frame data of each color stored in the line memories 52R, 52G and 52B, and outputs the generated video signal to the above source driver SD. At the time of transparent scanning, the data converter 53 generates a video signal by converting the sub-frame data of each color stored in the line memories 52R, 52G and 52B such that the potential difference between signal line voltage Vsig of the signal lines S1 to Sm and common voltage Vcom is in the range of transparent voltage. The data converter 53 outputs the video signal to the source driver SD.

The light source controller 54 outputs a light source control signal to the light source driver LSD based on the luminance setting information from outside (in other words, an external set), the video signal output from the data converter 53 and a control signal from the timing controller TC. The light source driver LSD drives the light-emitting elements LSR, LSG and LSB based on the light source control signal. The light-emitting elements LSR, LSG and LSB may be driven by, for example, pulse width modulation (PWM) control. The light source driver LSD is capable of adjusting the luminance of the light-emitting elements LSR, LSG and LSB by the duty ratio of the signals output to the light-emitting elements LSR, LSG and LSB.

The timing generator 50 controls the operation timing of the frame memory 51, the line memories 52R, 52G and 52B, the data converter 53 and the light source controller 54 in synchronization with a vertical synchronization signal Vsync and a horizontal synchronization signal Hsync input from outside. The timing generator 50 generates a source driver control signal for controlling the source driver SD, a gate driver control signal for controlling the gate drivers GD1 and GD2, and a Vcom control signal for controlling the Vcom circuit VC.

Figure 12:
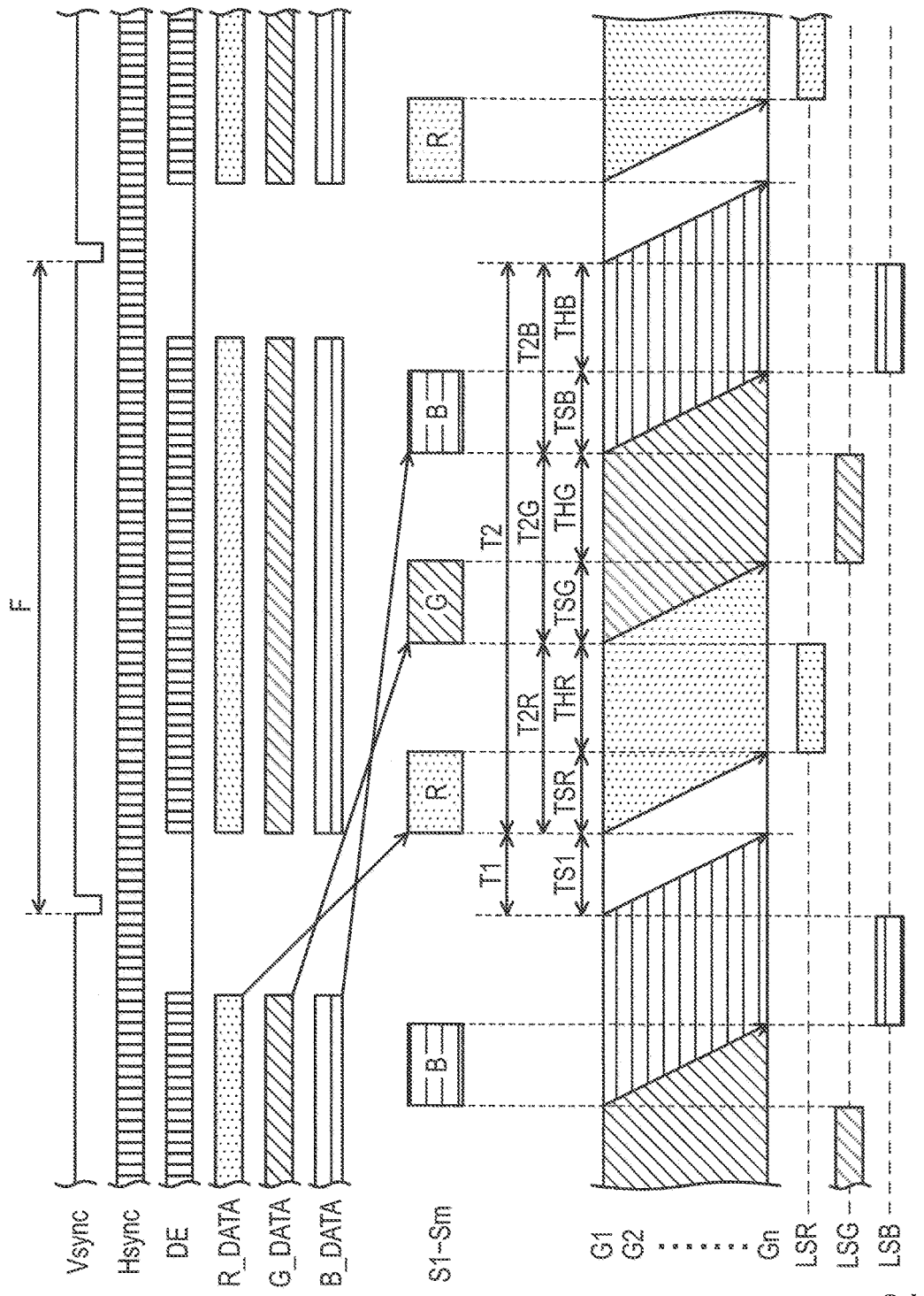
FIG. 12 is a timing chart showing an example of display operation.

FIG. 12 is a timing chart showing an example of display operation. A vertical synchronization signal Vsync falls for a short period of time when a frame is started. In the example of FIG. 12, the period which starts when the vertical synchronization signal Vsync falls and continues until the signal falls again is equivalent to a frame period F. For example, when the display device DSP is driven at 60 Hz, each frame period F is approximately 16.7 ms.

Each frame period F includes a first period T1 for performing the above transparent scanning, and a second period T2 for performing the above display scanning. In the example of FIG. 12, the first period T1 is provided at the head of the frame period F, and the second period T2 follows the first period T1. In reverse order, the first period T1 may follow the second period T2. For example, the first period T1 is shorter than the second period T2.

In the first period T1, transparent scanning is performed under the control of the timing controller TC. The gate drivers GD1 and GD2 supply a scanning signal to the scanning lines G1 to Gn in series. While a scanning signal is supplied, the source driver SD applies, for example, signal line voltage Vsig equal to common voltage Vcom to the signal lines S1 to Sm. By this operation, transparent voltage is written between the pixel electrodes 11 of all the pixels PX and the common electrode 21. The pixel electrode 11 of each pixel PX is in a floating state until a next scanning signal is supplied to a corresponding scanning line G after a scanning signal is supplied to the scanning line G. Thus, transparent voltage is retained in each pixel PX to which transparent voltage is written until a next scanning signal is supplied to a corresponding scanning line G.

In each pixel PX to which transparent voltage is written, the liquid crystal layer 30 is in a good transparent state. Thus, the visibility of the background of the display panel PNL is increased. All of the light-emitting elements LSR, LSG and LSB are turned off in the first period T1.

The signal line voltage Vsig applied to the signal lines S1 to Sm in the first period T1 is not necessarily equal to common voltage Vcom as long as the voltage written to each pixel PX is transparent voltage. The various forms explained with reference to FIG. 9 and FIG. 10 may be applied to common voltage Vcom and signal line voltage Vsig in transparent scanning.

The scanning period in which a scanning signal is supplied to the scanning lines G1 to Gn in the first period T1 in series is TS1. In the example of FIG. 12, the second period T2 comes immediately after the scanning period TS1. Thus, T1 is equal to TS1. After the scanning period TS1, the first period T1 may include a retention period for further retaining transparent voltage.

In transparent scanning, a scanning signal may be simultaneously supplied to all the scanning lines G. Even in this case, transparent voltage can be written to each pixel PX.

The second period T2 includes sub-frame periods T2R, T2G and T2B. In the example of FIG. 12, the sub-frame periods T2R, T2G and T2B are arranged in this order after the first period T1. However, they may be arranged in a different order. In the second period T2, the timing generator 50 controls the frame memory 51, the line memories 52R, 52G and 52B and the data converter 53 with a data synchronization signal DE such that they perform the display scanning of each color.

The sub-frame period T2R includes a scanning period TSR and a retention period THR. In the scanning period TSR, the gate drivers GD1 and GD2 supply a scanning signal to the scanning lines G1 to Gn in series. Further, while a scanning signal is supplied, the source driver SD applies signal line voltage Vsig to the signal lines S1 to Sm in accordance with the red sub-frame data (R_DATA) stored in the line memory 52R. More specifically, an operation for simultaneously applying, to the signal lines S1 to Sm, signal line voltage Vsig having a gradation corresponding to each pixel PX of each line to which a scanning signal is supplied is repeated.

By this operation, voltage is written between the pixel electrode 11 of each pixel PX and the common electrode 21 in accordance with red sub-frame data. In the second period T2, the signal line voltage Vsig applied to each pixel electrode 11 through the signal lines S1 to Sm has a polarity different from that of the common voltage Vcom of the common electrode 21, or is reference voltage Vsig-c. Thus, the voltage written to each pixel PX is greater than or equal to 8 V and less than or equal to 16 V. The retention period THR is a period which starts after the completion of writing to all the pixels PX and continues until the sub-frame period T2G comes. In the retention period THR, the red light-emitting element LSR lights up. Thus, a red image is displayed in the display area DA.

The operation in the sub-frame periods T2G and T2B is the same as the sub-frame period T2R. The sub-frame period T2G includes a scanning period TSG and a retention period THG. In the scanning period TSG, voltage is written to each pixel PX in accordance with the green sub-frame data (G_DATA) stored in the line memory 52G. In the retention period THG, the green light-emitting element LSG lights up. In this way, a green image is displayed in the display area DA. The sub-frame period T2B includes a scanning period TSB and a retention period THB. In the scanning period TSB, voltage is written to each pixel PX in accordance with the blue sub-frame data (B_DATA) stored in the line memory 52B. In the retention period THB, the blue light-emitting element LSB lights up. In this way, a blue image is displayed in the display area DA.

In a frame period F, the image data to be displayed in the next frame period F is written to the frame memory 51. Further, the sub-frame data of the line memories 52R, 52G and 52B in which writing to the pixels PX is completed is rewritten in sub-frame data corresponding to the image data written to the frame memory 51.

As the red, green and blue images displayed by time division in the second period T2 are mixed, the images are viewed as an image of multicolor display by the user. In the first period T1, for example, the transparent voltage in the range of $0 \text{ V} \leq \text{VLC} \leq 8 \text{ V}$ is applied between the pixel electrode 11 of each pixel PX and the common electrode 21. By repeating this first period T1 for each frame, the transparency of the display area DA is increased, thereby improving the visibility of the background of the display area DA.

The transparency of the display area DA is increased with increasing proportion of the first period T1 to each frame period F. However, the visibility of an image may be decreased. In consideration of these factors, the length of the first period T1 is, for example, preferably less than or equal to half the length of each frame period F. However, when a significance is placed on transparency, the proportion of the first period T1 to each frame period F may be further increased. The sub-frame periods T2R, T2G and T2B may have, for example, the same length. The color chromaticity of the image to be displayed may be adjusted by differentiating the proportions of the sub-frame periods T2R, T2G and T2B from each other.

A plurality of first periods T1 may be included in each frame period F. FIG. 13 is a timing chart showing an example of display operation in which each frame period F includes a plurality of first periods T1. In the example of FIG. 13, the first period T1 is provided at the head of each frame period F. In addition, the first period T1 is provided between the sub-frame periods T2R and T2G and between the sub-frame periods T2G and T2B.

The three first periods T1 have, for example, the same length. However, they may have different lengths. To achieve both the transparency and the visibility of an image, the total length of the three first periods T1 is preferably less than or equal to half the length of each frame period F. However, when a significance is placed on transparency, the proportion of the first periods T1 to each frame period F may be further increased.

Figure 14:
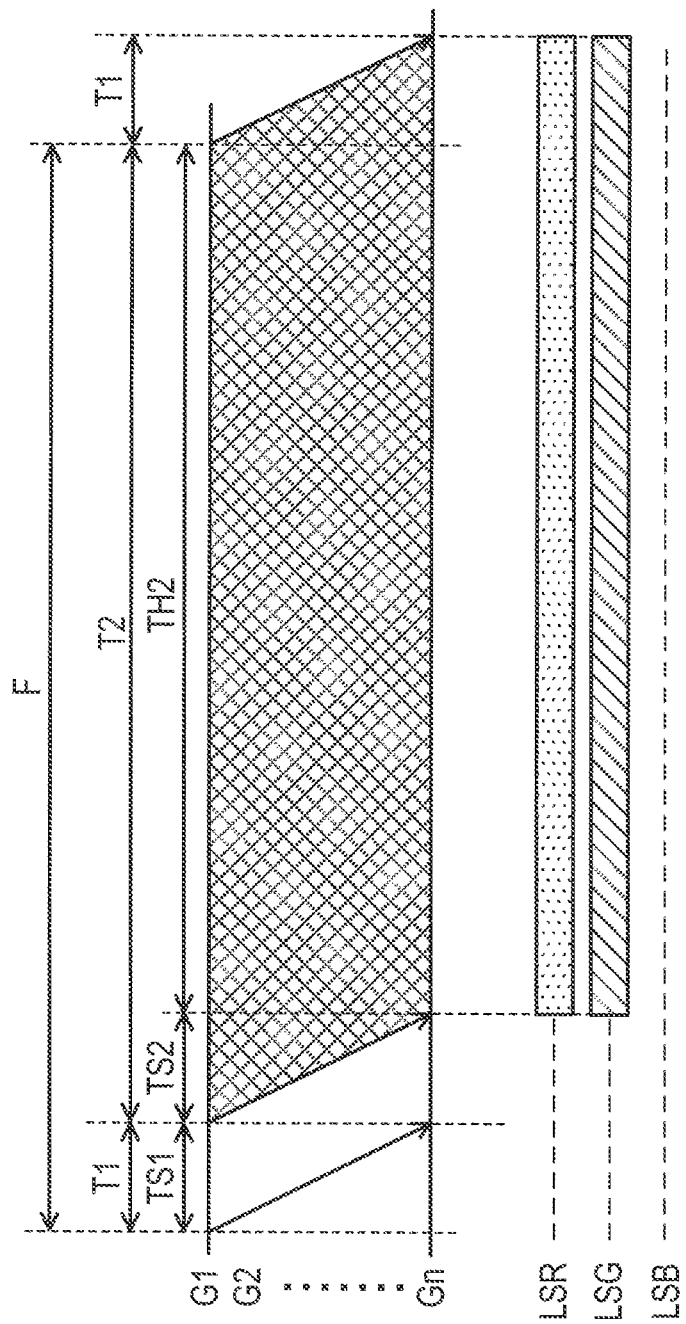
FIG. 14 is a timing chart showing another example of display operation.

The display device DSP may perform display operation using a single light source color as well as a field sequential system. FIG. 14 is a timing chart showing an example of display operation using a single light source color. The structure in which each frame period F includes the first period T1 and the second period T2 is common to the example of FIG. 14 and the example of FIG. 12. However, the second period T2 does not include any one of the sub-frame periods T2R, T2G and T2B. The second period T2 includes a scanning period TS2 and a retention period TH2. In the scanning period TS2, voltage is written to each pixel PX in accordance with image data. In the retention period TH2, the voltage written to each pixel PX is retained.

In the retention period TH2, light-emitting elements LS corresponding to the color of the image to be displayed light up. The light-emitting elements LS may continue to light up until the scanning of the scanning lines G1 to Gn in the first period T1 of the next frame period F is completed as shown in FIG. 14. Alternatively, the light-emitting elements LS may continue to light up only during the retention period TH2.

In the example of FIG. 14, the red light-emitting element LSR and the green light-emitting element LSG light up. In this way, yellow as a light source color is obtained by mixing red and green. A yellow image is displayed in the display area DA. As the light-emitting elements LS are driven by the above PWM control, the colors of the light-emitting elements LS lighting up at the same time can be adjusted, thereby realizing various light source colors. In display scanning, only one of the light-emitting elements LSR, LSG and LSB may light up. Alternatively, three of them may light up at the same time.

The display device DSP may be configured to switch the display operation shown in FIG. 12 to FIG. 14 based on, for example, the control signal input from outside. The display device DSP may be set in advance so as to perform the display operation shown in one of FIG. 12 to FIG. 14.

According to the above present embodiment, as described above, the visibility of the background through the display device DSP can be increased. In this way, it is possible to obtain a display device DSP having excellent display quality and allowing the user to view a display image overlapping the background with high visibility.

In the structure of the present embodiment, the display device DSP can be driven by using a source driver SD in which the withstand voltage is low. This effect is explained with reference to FIG. 6.

This specification assumes a comparison example in which common voltage Vcom is DC voltage, and polarity inversion is applied to only signal line voltage Vsig based on common voltage Vcom as the center. In this case, when signal line voltage Vsig is equal to common voltage Vcom, 0 V of voltage can be written to each pixel PX in normal display scanning. However, in this comparison example, to use the scattering voltage of FIG. 6 for gradation reproduction, signal line voltage Vsig must be variable in a range of −16 V to +16 V relative to common voltage Vcom. The circuits such as the source driver SD need to have a withstand voltage of 32 V.

In the structure of the present embodiment, as shown in FIG. 8, for example, the polarity of common voltage Vcom is inverted in line units. Thus, even when the withstand voltage of the source driver SD is 16 V (positive: 8 to 16 V, negative: 0 to 8 V), 16 V of voltage can be applied to the liquid crystal layer 30. In this way, the luminance by scattering can be increased. Thus, a withstand voltage of 16 V is sufficient for the circuits such as the source driver SD. By decreasing the withstand voltage of the circuits, the sizes of the circuits and the manufacturing costs can be reduced. Various desirable effects can be obtained from the present embodiment other than the above description.

[Second Embodiment]

In a second embodiment, differences from the first embodiment are mainly explained. The explanation of the same structures as the first embodiment is omitted.

FIG. 15 shows the main structural components of a display device DSP according to the present embodiment. The structure of the display device DSP shown in FIG. 15 is different from that of FIG. 3 in respect that a controller CNT comprises a level conversion circuit (L/S circuit) LSC and a Vcom lead-in circuit LIC.

The common voltage Vcom applied from a Vcom circuit VC is applied to a common electrode 21 and is also applied to the Vcom lead-in circuit LIC. The Vcom lead-in circuit LIC is interposed between a source driver SD and each signal line S. The Vcom lead-in circuit LIC supplies a video signal output from the source driver SD to each signal line S. The Vcom lead-in circuit LIC is also capable of applying the common voltage from the Vcom circuit VC to each signal line S.

FIG. 16 shows a structural example of the Vcom lead-in circuit LIC. The Vcom lead-in circuit LIC comprises switching elements SW1 to SWm. The switching elements SW1 to SWm are provided on, for example, a first substrate SUB1 provided in a display panel PNL. A line LN1 is connected to the input terminals (sources) of the switching elements SW1 to SWm. The signal lines S1 to Sm are connected to the output terminals (drains) of the switching elements SW1 to SWm. A line LN2 is connected to the control terminals (gates) of the switching elements SW1 to SWm.

The Vcom circuit VC shown in FIG. 15 applies common voltage Vcom to the line LN1. A timing controller TC outputs a control signal to the level conversion circuit LSC when transparent scanning is performed. The level conversion circuit LSC converts the control signal into voltage at a predetermined level, and supplies the control signal to the line LN2. When the control signal is supplied to the line LN2, the line LN1 is electrically continuous with the signal lines S1 to Sm, and the common voltage Vcom of the line LN1 is applied to the signal lines S1 to Sm.

When a scanning signal is supplied to scanning lines G1 to Gn in a state where common voltage Vcom is applied to the signal lines S1 to Sm, the common voltage Vcom of the signal lines S1 to Sm is applied to pixel electrodes 11. The potential difference between each pixel electrode 11 and the common electrode 21 is zero (transparent voltage).

In a period in which the switching elements SW1 to SWm are turned on by the control signal supplied to the line LN2, and common voltage Vcom is supplied to the signal lines S1 to Sm, the source driver SD controls the output to the signal lines S1 to Sm so as to be high impedance.

Even in the structure of the present embodiment, transparent scanning similar to that of the first embodiment can be performed. Transparent scanning may be performed based on timing similar to that of the first embodiment. In the structure of the present embodiment, for example, there is no need to provide a circuit for applying voltage (for example, common voltage Vcom) for transparent scanning to the source driver SD.

The present invention is not limited to the embodiments described above. The constituent elements of the invention can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted, and the constituent elements described in different embodiments may be arbitrarily combined.

In each embodiment, when the liquid crystal molecules 32 are negative liquid crystal molecules having negative dielectric anisotropy, it is possible to improve the degree of diffusion of the liquid crystal layer 30 and decrease the transparency by setting the signal line voltage Vsig applied to the signal lines S1 to Sm so as to be less than or equal to predetermined voltage.

In each embodiment, red, green and blue are examples of first, second and third colors, respectively. The light-emitting elements LSR, LSG and LSB are examples of a first light-emitting element which emits light in the first color, a second light-emitting element which emits light in the second color and a third light-emitting element which emits light in the third color, respectively. The sub-frame data stored in the line memories 52R, 52G and 52B is examples of first sub-frame data indicating an image in the first color, second sub-frame data indicating an image in the second color and third sub-frame data indicating an image in the third color, respectively. The sub-frame periods T2R, T2G and T2B included in the second period T2 are examples of first, second and third sub-frame periods, respectively.

The first, second and third colors are not limited to red, green and blue, respectively. The number of types of light-emitting elements LS provided in the light source unit LU may be less than or greater than three. The number of line memories, sub-frame data and sub-frame periods may be increased or decreased in accordance with the number of types (colors) of light-emitting elements LS.

The line memories 52R, 52G and 52B shown in FIG. 11 may be omitted. In this case, a structure in which the frame memory 51 outputs sub-frame data corresponding to each color to the data converter 53 in series may be employed.

What is claimed is:

1. A display device comprising:
a display panel including a plurality of pixels, a common electrode, a plurality of pixel electrodes provided for the pixels, respectively, and a liquid crystal layer containing a polymer dispersed liquid crystal, wherein the display panel has a first edge and a second edge that is opposite the first edge;
a light source which emits light to the display panel from the first edge into the liquid crystal layer towards the second edge; and
a controller which controls voltage between the common electrode and the pixel electrodes, wherein
the liquid crystal layer scatters light from the light source when a scattering voltage is applied between the common electrode and the pixel electrodes, and transmits light from the light source from the first edge across the liquid crystal layer to the second edge when a transparent voltage less than the scattering voltage is applied between the common electrode and the pixel electrodes such that the common electrode and the pixel electrode are at a substantially same potential with the transparent voltage applied, and
the controller applies the transparent voltage between the common electrode and the pixel electrodes in a first period, and applies the scattering voltage between the common electrode and the pixel electrodes in accordance with image data in a second period.

2. The display device of claim 1, wherein
the controller turns off the light source in the first period and lights up the light source in the second period.

3. The display device of claim 1, wherein
a frame period in which an image is displayed in accordance with image data includes at least one first period.

4. The display device of claim 3, wherein
the light source includes a first light-emitting element which emits light in a first color, and a second light-emitting element which emits light in a second color,
the image data includes first sub-frame data indicating an image in the first color, and second sub-frame data indicating an image in the second color,
the second period includes a first sub-frame period and a second sub-frame period, and
the controller
in the first sub-frame period, lights up the first light-emitting element, and applies voltage between the common electrode and the pixel electrodes in accordance with the first sub-frame data, and
in the second sub-frame period, lights up the second light-emitting element, and applies voltage between the common electrode and the pixel electrodes in accordance with the second sub-frame data.

5. The display device of claim 4, wherein
in the frame period, the first sub-frame period and the second sub-frame period follow the first period.

6. The display device of claim 4, wherein
in the frame period, the first period is provided between the first sub-frame period and the second sub-frame period.

7. The display device of claim 3, wherein
the first period is less than or equal to half the frame period.

8. The display device of claim 1, wherein
the controller is capable of applying a positive voltage higher than a reference voltage and a negative voltage lower than the reference voltage to the common electrode and the pixel electrodes, and
a voltage of each of the pixel electrodes in the second period has a polarity different from a polarity of a voltage of the common electrode, or is the reference voltage.

9. The display device of claim 8, wherein
the voltage of each of the pixel electrodes in the first period has a same polarity as the voltage of the common electrode.

10. The display device of claim 8, wherein
both the voltage of the common electrode and the voltage of each of the pixel electrodes in the first period are the reference voltage.

11. The display device of claim 8, wherein
the display panel includes a plurality of switching elements provided in the pixels, respectively, a plurality of scanning lines which scan the switching elements, and a plurality of signal lines which intersect the scanning lines and are connected to the pixel electrodes via the switching elements, and
the controller supplies a scanning signal to the scanning lines in series in the second period, and inverts the polarity of the voltage of the common electrode and a polarity of voltage applied to the signal lines every time a scanning signal is supplied to at least one of the scanning lines.

12. The display device of claim 1, wherein
luminance of light scattered by the liquid crystal layer to which the transparent voltage is applied is less than 10% of luminance of light scattered by the liquid crystal layer to which an upper limit of the scattering voltage is applied.

13. The display device of claim 1, wherein
the first period is shorter than the second period.

14. The display device of claim 1, wherein
the light source faces an end portion of the display panel, and
in the first period, a background of the display panel is viewable.

15. The display device of claim 1, wherein
the transparent voltage is substantially 0 V.

* * * * *